UNITED STATES PATENT OFFICE.

PAUL RADENHAUSEN, OF ALTONA, SLESWICK-HOLSTEIN, PRUSSIA, GERMANY, ASSIGNOR TO THE DAVENPORT GLUCOSE MANUFACTURING COMPANY, OF DAVENPORT, IOWA.

MANUFACTURE OF STARCH, GLUCOSE, &c.

SPECIFICATION forming part of Letters Patent No. 319,315, dated June 2, 1885.

Application filed April 30, 1884. (No specimens.)

*To all whom it may concern:*

Be it known that I, PAUL RADENHAUSEN, of Altona, Province of Sleswick-Holstein, Prussia, Germany, have invented a new and useful Improvement in the Manufacture of Starch, Glucose, and other Starch Products, of which the following is a description.

This invention relates to the manufacture of starch, glucose, and other subsequent starch products from corn and other grain; and it consists in precipitating the starch-milk after it comes from the separators with sulphuric acid, whereby ammoniacal putrefaction is immediately stopped, and the separation of solid matter therein more rapidly and effectually obtained; and it furthermore consists in the subsequent treatment of the residue, after the acid water has been drawn off, with dilute sulphuric acid and passing of the liquid over the starch depositors, where the starch settles in a hard mass, nearly free from gluten and other impurities of the grain, substantially as hereinafter set forth.

Heretofore in the manufacture of starch from corn and other grain the efforts of those engaged in such production have been principally directed to liberating the starch from the cells of the grain, and for this purpose a solution of caustic soda has been used with more or less success by means of apparatus in which the prepared starch stock and water were first passed through a separator into a settling-vat, and, after the water had been decanted, caustic alkali was added, and the mass then agitated and pumped into a depositor, where the starch was deposited and the gluten, dissolved by the alkali, passed off, after which the starch was again mixed with water, agitated, settled, and drained. Conspicuous among the advantages of this process was the destructive action of the soda on the ferments, which by their interference prevented the starch from settling in a hard mass on the long planes used for the purpose. It was accordingly invariably required to add a surplus of caustic alkali in order to obtain the greatest possible yield of starch; but the more soda was added the more albumenoids were dissolved. A considerable quantity of the lye was accordingly taken up by the starch, and it required several washings to free it again from these impurities.

My invention overcomes these difficulties as follows: I precipitate with sulphuric acid the starch-milk coming from the separators and collected in tanks, the liquid containing from 0.1 to 0.2 per cent. sulphuric acid, more or less. The acid stops fermentation and ammoniacal putrefaction instantly, and the separation of the solid matter is effected in a much shorter time than by the ordinary process of settling. The acid water, containing most of the soluble constituents of the corn or other grain, is drawn off, and the residue again stirred up in dilute sulphuric acid of about 0.1 to 0.2 per cent. $So_4H_2$. This liquid is then allowed to flow over the starch-planes, where the starch settles in a hard mass nearly free from gluten and other impurities of the corn or grain.

The starch manufactured by this process contains a small quantity of sulphuric acid, which, however, is of no detriment when the starch is to be used in the manufacture of glucose or grape-sugar. In cases where the remaining acid would be injurious, it can be neutralized with soda or other alkali and the sulphates washed out in the ordinary way.

The advantages of my improved process over the soda process are, first, the immediate stoppage of fermentation and ammoniacal putrefaction, whereby the starch and offal are obtained in a much purer state; secondly, the process will be found much less costly than the soda one heretofore practiced; and, thirdly, no gluten is lost in a soluble form, as the general effect of the process is to dissolve as little as possible of the ground grain.

In defining my invention with still greater clearness I would state that I am aware of the process described in the patent to William W. Underhill, dated March 4, 1884, in which sulphurous acid is introduced into the starch-water to prevent fermentation.

My invention is distinctive with respect to the above process in that, first, in preventing ammoniacal putrefaction the sulphuric acid is not only much more effective, but is also much cheaper than sulphurous acid; second, the sulpuric acid treatment is free from the disadvantages of the sulphurous-acid process. The starch-milk when saturated with sulphurous acid will give off the poisonous gas when spread over the large surface of the starch-tables, and the free gas is very injurious to the health of the workmen, who are obliged to be constantly over the broad expanse of the starch-tables.

I make no claim to the use of sulphuric acid in the soaking process of the corn before being ground, as this is not new; but only to the addition of sulphuric acid to the ground-up mass or the separated starch-milk, in which connection the advantages heretofore mentioned are attained.

Having thus described my invention, what I claim as new is—

1. The process of arresting ammoniacal putrefaction in the starch-milk after it has been separated and precipitating the solid matters more quickly and effectually, which consists in adding to the ground-up grain or starch liquor sulphuric acid, substantially in the manner and for the purposes described.

2. The process herein described of manufacturing starch, glucose, and other starch products from corn and other grain, which consists in first passing the crushed grain and water through separators, then precipitating the separated starch-milk with sulphuric acid, then drawing off the acid water and soluble constituents of the grain contained in it, and stirring up the residue in dilute sulphuric acid, and afterward passing the liquid thus obtained over the starch-depositors, substantially as and for the purposes specified.

PAUL RADENHAUSEN.

Witnesses:
LOUIS P. BEST,
C. A. DALZELL.